Patented Jan. 3, 1939

2,142,948

UNITED STATES PATENT OFFICE 2,142,948

OLEFINE OXIDATION AND CATALYST THEREFOR

George H. Law, South Charleston, W. Va., assignor to Carbide and Carbon Chemicals Corporation, a corporation of New York No Drawing. Original application August 7, 1937, Serial No. 157,883. Divided and this application March 30, 1938, Serial No. 198,858

10 Claims. (Cl. 260—348)

This application is a division of my copending application Serial No. 157,883, filed August 7, 1937.

One of the most common expedients for obtaining catalytically active metallic surfaces for use in carrying out various catalytic reactions is by alternate oxidation and reduction of the metal. In most cases this can be done by passing air or oxygen over the heated metal, followed by reduction of the metal oxide with hydrogen or the like. In the chemically unique reaction of the process invented by T. E. Lefort and shown in Reissue Patent 20,370 dated May 18, 1937, olefine oxides are formed by causing olefines to combine directly with molecular oxygen in the presence of a surface catalyst at temperatures between about 150° and about 400° C. Silver is the preferred catalyst for effecting Lefort's reaction, and it is, of course, desirable to use a silver surface catalyst for this reaction which has a maximum of catalytic activity.

Due to the low dissociation temperature (at atmospheric pressure) of silver oxide, it is not possible to oxidize silver easily by either air or oxygen for the purpose of increasing its activity as a catalytic material according to the common procedure mentioned. For this reason, special conditions are required for the preparation by oxidation of silver surface catalysts in those highly active forms desired for the economic conduct of the Lefort process.

The primary object of this invention is to provide a convenient, simple and effective method of activating silver surface catalysts for use in the direct oxidation of olefines to form olefine oxides. The invention also includes the new catalysts as well as the improvements in the process of oxidizing olefines directly to form olefine oxides which are achieved by the use in the process of catalysts activated according to this invention.

The activation of silver surface catalysts for conducting the process of forming olefine oxides by direct oxidation of olefines can be accomplished by treating the silver surface with water vapor and ozone at relatively low temperatures, followed by reduction of the silver peroxide formed with hydrogen at higher temperatures. Alternatively, reduction of the silver peroxide can be replaced by a treatment with a solution of a hydroxide of barium, strontium or lithium. This latter treatment produces a catalytic material which is of the same general type as that formed of a mixture of silver (or silver oxide) and peroxides of barium, strontium or lithium. Catalysts such as these are exceptionally active and desirable for use in the process of directly oxidizing olefines to form olefine oxides, and they form the subject of the copending applications of R. W. McNamee and C. M. Blair, Serial Nos. 157,854 and 218,722, filed August 7, 1937 and July 12, 1938.

The active silver surface catalysts and their production according to the treatment in which the ozonized silver surface is reduced with hydrogen or another reducing gas are the subject of my copending application Serial No. 157,883, filed August 7, 1937.

Surface catalysts which contain silver in any physical form can be treated by the methods of this invention to effect pronounced increase in their activity in the Lefort reaction. The extent to which the catalytic activity is increased may be varied considerably, and is dependent both on the original form and condition of the silver and on the number of times the ozonization and reduction are repeated, and on whether treatment of the ozonized product with a hydroxide of barium, strontium or lithium replaces the final reduction. In general, finely divided silver having a roughened surface is more readily activated than silver in forms having a smooth polished surface.

It is desirable, but not essential, to start with silver deposited on the surface of a granular inert supporting material, such as porous artificial silica filter stone, sandstone, or one of the commercially available alumina refractory materials. The silver may be deposited on such a support by chemical means, as by the decomposition of a silver salt, or mechanically from suspensions of finely divided metallic silver or silver oxide. The amount of silver in those catalysts which employ supporting materials may vary over a wide range, but, in general, from about 4% to about 20% by weight is satisfactory.

Although silver peroxide decomposes at the temperatures of around 150° to 400° C. which are employed in the operation of the process of oxidizing olefines directly to form olefine oxides, the silver surface catalysts are much less active when used in the ozonized condition than when they are reduced with hydrogen or treated with a solution of a hydroxide of barium, strontium or lithium subsequent to the ozone treatment.

The ease with which ozonization may be accomplished varies with the original condition and form of the silver in the same way as does the extent of activation conferred by the treatment. Thus, in the activation of silver in the form of powder (200 mesh or finer), or material derived from the decomposition of silver nitrate, the ozonization occurs satisfactorily at room temperature. On the other hand, silver wire which presents a highly polished, smooth surface may require a temperature of 200° C. or higher for the initial peroxidation. In any case, after one ozonization and decomposition of the silver peroxide has been successfully effected, succeeding reactions with ozone can be carried out at atmospheric temperature. In general, ozonization may be carried out at temperatures from about 20° to 250° C., dependent on the circumstances discussed, and the preferred temperature for this operation is about 40° to 50° C. Reduction of the silver peroxide with hydrogen is inaugurated, but proceeds slowly, at about 90 C., and it is quite rapid above 200° C. This step of the procedure may be effected at temperatures ranging from about 100° to about 250° C., and the preferred temperature for the reduction is about 150° C. Reducing gases other than hydrogen may be employed, but it is preferable to use hydrogen for this purpose.

In the treatment of silver with ozone, it is desirable to avoid the use of equipment formed of iron, copper or plain steel, since these materials tend to promote a rapid decomposition of ozone. Such materials as aluminum, glass or chromium steels do not exert this effect and are satisfactory. Silver peroxide itself also tends to hasten the decomposition of ozone, but this tendency can be largely overcome by adding liquid water to the reaction vessel at such a rate as to provide a coating of liquid water for the silver peroxide as it is formed, but not for the unreacted silver. The presence of water vapor is necessary for the reaction between silver and ozone, but the existence of a film of liquid water on the material appears to inhibit this reaction.

The following examples will serve to illustrate the invention:

Example 1

A stainless steel (containing about 18% Cr and about 8% Ni) tube having an inside diameter of about one inch and provided with an inner tube 0.25 inch in outside diameter was used for the treatment of the silver surface catalyst and for the conduct of the olefine oxidation. The inner tube extended 25 inches into the catalyst tube from its exit end and served as a pyrometer well. The catalyst tube was arranged to be heated electrically over 36 inches of its length. The catalyst was prepared by evaporating to dryness an aqueous mixture containing 20 grams of silver nitrate and 200 cc. of granular porous silica stone sized between 4 and 8 mesh screens. This material was placed in the tube and reduced with hydrogen for ten hours at temperatures increasing from 150° to 220° C.

The temperature of the tube and the reduced silver-bearing surface catalyst was raised to and maintained at about 80° C. Oxygen saturated with water vapor and containing about 1% ozone was admitted to the tube at the rate of 7 liters per hour. This was continued for about 30 minutes after the odor of ozone could be detected in the gases issuing from the tube. The ozone-treated material was then heated to a temperature of 90° C., and a 24% aqueous solution of barium hydroxide octahydrate also heated to 90° C. was added to the catalyst tube. After standing 5 minutes over the catalyst, the barium hydroxide solution was drained off.

The catalyst following this treatment was heated to a temperature of 290° C., and a mixture of ethylene and air containing 10.3% ethylene was fed to the tube at the rate of 56 liters per hour. The issuing gases were found to contain ethylene oxide in an amount equal to 270% of the yield obtained under identical conditions using the same catalyst after the initial reduction but prior to the ozone treatment.

Example 2

A catalyst was prepared by evaporating to dryness an aqueous suspension of 25 grams of 200 mesh silver powder and 200 cc. of granular porous silica stone sized between 4 and 8 mesh screens. The resulting catalyst material was then repeatedly ozonized and reduced and finally treated in ozonized condition with a barium hydroxide solution under conditions as described in Example 1. Each treatment with ozone was carried out at room temperature. The first reduction with hydrogen was conducted at 250° C. for about 4 hours, and all subsequent reductions were carried out at 150° C.

The material was tested under operating conditions for the production of ethylene oxide at various times between the several series of activating treatments. In each case a mixture of ethylene and air containing 10% of ethylene was passed at the rate of 56 liters per hour over the catalyst while it was maintained at a temperature of 290° to 295° C. in a catalyst tube made of the materials and in the form described in Example 1. The first test was made after the material had been ozonized, reduced and again ozonized. In this condition it was found to exert very little catalytic activity, producing less than 0.1% ethylene oxide in the exit gases. It was again tested after being once more ozonized, reduced and ozonized, and its activity was the same as before. This shows that the catalysts according to this invention have no substantial activity when employed in the ozonized condition. The third test for the production of ethylene oxide was made after the material had been once more ozonized and reduced with hydrogen. In the reduced condition it was found to be much more active, yielding about 1.9% ethylene oxide in the exit gases. This treatment was repeated and the catalyst again used in reduced condition, whereupon it produced about 2.25% ethylene oxide in the issuing gases. Finally, the material after being again ozonized and treated with a solution of barium hydroxide was made to produce ethylene oxide amounting to 4.0% of the exit gases.

Variations in the specific procedures shown in the foregoing examples will be apparent and may be adopted without departing from the essentials of this invention. The catalysts activated in accordance with this invention can be used to cause olefines, especially ethylene, to combine directly with molecular oxygen to form the corresponding olefine oxide at temperatures between about 150° and about 400° C. Also, and as shown by Lefort, the reaction proceeds at either atmospheric pressure or at increased or decreased pressures, and any desired proportion of the olefine and oxygen or air (or other oxygen-containing gas) can be used. The surface catalysts of this invention can be disposed in the reaction vessel in any desired means which will insure the necessary contact of the reactants with the catalyst. The size of the particles of the catalyst support is not critical and can be chosen to suit the conditions of operation. The proportion of the hydroxide of barium, strontium or lithium introduced into the ozonized catalysts may range from about 2% to about 40% by weight of the silver contained in the catalyst.

Other modifications of the process employing the catalyst, as well as of the catalyst, are included within the scope of the invention as defined by the appended claims.

I claim:

1. Process for activating silver surface catalysts for use in effecting the direct chemical combination of olefines with molecular oxygen to form olefine oxides, which comprises treating the silver with ozone to form silver peroxide and treating the ozonized silver with a solution of a hydroxide of one of the group consisting of barium, strontium and lithium to form an active surface catalyst.

2. Process for activating silver surface catalysts for use in effecting the direct chemical combination of olefines with molecular oxygen to form olefine oxides, which comprises treating the silver with ozone and water vapor to form silver peroxide and treating the ozonized silver with a solution of a hydroxide of one of the group consisting of barium, strontium and lithium to form an active surface catalyst.

3. Process for activating silver surface catalysts for use in effecting the direct chemical combination of olefines with molecular oxygen at temperatures between about 150° and about 400° C. to form olefine oxides, which comprises treating the silver surface with ozone and water vapor at a temperature between about 20° and about 250° C. to form silver peroxide while admitting liquid water to the reaction vessel at a rate sufficient to provide a film of liquid water on the silver peroxide only, and treating the ozonized silver with a solution of a hydroxide of one of the group consisting of barium, strontium and lithium to form an active surface catalyst.

4. Process for activating silver surface catalysts for use in effecting the direct chemical combination of olefines with molecular oxygen at temperatures between about 150° and about 400° C. to form olefine oxides, which comprises treating the silver surface with ozone and water vapor at a temperature between about 20° and about 250° C. to form silver peroxide while admitting liquid water to the reaction vessel at a rate sufficient to provide a film of liquid water on the silver peroxide only, and treating the ozonized silver with a solution of barium hydroxide to form an active surface catalyst.

5. Process of making ethylene oxide by the direct chemical combination of ethylene with molecular oxygen at temperatures between about 150° and about 400° C. in the presence of a surface catalyst, which comprises employing a silver surface catalyst activated by treating the silver surface with ozone and water vapor at a temperature between about 20° and about 250° C. to form silver peroxide on said surface and thereafter treating said ozonized surface with a heated solution of a hydroxide of one of the group consisting of barium, strontium and lithium to produce an active catalytic surface.

6. Process of making ethylene oxide by the direct chemical combination of ethylene with molecular oxygen at temperatures between about 150° and about 400° C. in the presence of a surface catalyst, which comprises employing a silver surface catalyst activated by treating the silver surface with ozone and water vapor at a temperature between about 20° and about 250° C. to form silver peroxide on said surface and thereafter treating said ozonized surface with a heated solution of strontium hydroxide to produce an active catalytic surface.

7. Process of making ethylene oxide by the direct chemical combination of ethylene with molecular oxygen at temperatures between about 150° and about 400° C. in the presence of a surface catalyst, which comprises employing a silver surface catalyst activated by treating the silver surface with ozone and water vapor at a temperature between about 20° and about 250° C. to form silver peroxide on said surface and thereafter treating said ozonized surface with a heated solution of barium hydroxide to produce an active catalytic surface.

8. Process of making ethylene oxide by the direct chemical combination of ethylene with molecular oxygen at temperatures between about 150° and about 400° C. in the presence of a surface catalyst, which comprises employing a silver surface catalyst activated by treating the silver surface with ozone and water vapor at a temperature between about 20° and about 250° C. to form silver peroxide on said surface while admitting liquid water to the reaction vessel at a rate sufficient to provide a film of liquid water on the ozonized surface only, and thereafter treating said ozonized surface with a heated solution of a hydroxide of one of the group consisting of barium, strontium and lithium to produce an active catalytic surface.

9. An active silver surface catalyst capable of effecting the direct chemical combination of olefines with molecular oxygen to form olefine oxides, composed of silver which has been reacted with ozone and water vapor to form silver peroxide, followed by treatment of the ozonized silver with a solution of a hydroxide of a metal of the group consisting of barium, strontium and lithium to form the active surface catalyst.

10. An active silver surface catalyst capable of effecting the direct chemical combination of olefines with molecular oxygen to form olefine oxides, composed of silver which has been reacted with ozone and water vapor to form silver peroxide, followed by treatment of the ozonized silver with a solution of barium hydroxide to form the active surface catalyst.

GEORGE H. LAW.